(12) United States Patent
Liang

(10) Patent No.: US 12,340,138 B2
(45) Date of Patent: Jun. 24, 2025

(54) INTELLIGENT DISPLAY METHOD AND DEVICE, COMPUTER PROGRAM PRODUCT AND STORAGE MEDIUM

(71) Applicant: GOERTEK INC., Shandong (CN)

(72) Inventor: Liang Liang, Shandong (CN)

(73) Assignee: GOERTEK INC., Weifang (CN)

( * ) Notice: Subject to any disclaimer, the term of this patent is extended or adjusted under 35 U.S.C. 154(b) by 0 days.

(21) Appl. No.: 18/559,864

(22) PCT Filed: Dec. 15, 2021

(86) PCT No.: PCT/CN2021/138162
§ 371 (c)(1),
(2) Date: Nov. 9, 2023

(87) PCT Pub. No.: WO2022/257406
PCT Pub. Date: Dec. 15, 2022

(65) Prior Publication Data
US 2025/0077156 A1    Mar. 6, 2025

(30) Foreign Application Priority Data
Jun. 10, 2021 (CN) .......................... 202110650329.2

(51) Int. Cl.
G06F 3/14    (2006.01)
G06F 1/16    (2006.01)
G06F 3/01    (2006.01)

(52) U.S. Cl.
CPC ............ *G06F 3/1423* (2013.01); *G06F 1/163* (2013.01); *G06F 3/011* (2013.01)

(58) Field of Classification Search
CPC ... A61B 5/681; A61B 5/02438; A61B 5/0205; A61B 2562/0219; A61B 5/021;
(Continued)

(56) References Cited

U.S. PATENT DOCUMENTS 9,141,087 B2 *  9/2015  Brown ................... G04G 17/08
2015/0085621 A1  3/2015  Hong et al.
2019/0317563 A1  10/2019  Wang et al.

FOREIGN PATENT DOCUMENTS

CN     106547204 A    3/2017
CN     108074633 A    5/2018
(Continued)

OTHER PUBLICATIONS

International Search Report from International Application No. PCT/CN2021/138162 mailed Mar. 9, 2022.

*Primary Examiner* — Koosha Sharifi-Tafreshi
(74) *Attorney, Agent, or Firm* — Shih IP Law Group, PLLC

(57) ABSTRACT

An intelligent display method and device, a computer program product and a storage medium. The method includes: when the wearable device is in an operating state, acquiring, at a preset acquisition frequency, swing amplitudes of an arm on which the wearable device is located; determining, at a preset detection frequency, a maximum value and a minimum value of the swing amplitudes that are acquired within a latest preset duration period from current moment; determining a duration period for which the minimum value is continuously greater than a first preset threshold value and the difference between the maximum value and the minimum value is continuously less than or equal to a second preset threshold value; when it is detected that the duration period is greater than an exercise determination duration period, controlling a secondary screen of the wearable device to be displayed by lighting up.

9 Claims, 3 Drawing Sheets

(58) Field of Classification Search
CPC .............. A61B 5/02405; A61B 5/1118; A61B 5/02055; G04G 21/025; G06F 1/163
See application file for complete search history.

(56) References Cited

FOREIGN PATENT DOCUMENTS

| | | | |
|---|---|---|---|
| CN | 108510961 A | 9/2018 | |
| CN | 109240068 A | 1/2019 | |
| CN | 109710207 A | 5/2019 | |
| CN | 110187759 A | 8/2019 | |
| CN | 110638421 A | 1/2020 | |
| CN | 110680293 A | 1/2020 | |
| CN | 111473797 A | 7/2020 | |
| CN | 112199013 A | 1/2021 | |
| CN | 113282261 A | 8/2021 | |
| WO | WO-2007033768 A2 * | 3/2007 | ......... A61B 5/02438 |

\* cited by examiner

S10 — when the wearable device is in an operating state, acquiring, at a preset acquisition frequency, swing amplitudes of an arm on which the wearable device is located, and determining, at a preset detection frequency, a maximum value and a minimum value of the swing amplitudes of the arm among the swing amplitudes acquired within a latest preset duration period from current moment S20 — when the minimum value is greater than a first preset threshold value and a difference between the maximum value and the minimum value is less than or equal to a second preset threshold value, starting timing and determining a duration period for which the minimum value is continuously greater than the first preset threshold value and the difference between the maximum value and the minimum value is continuously less than or equal to the second preset threshold value S30 — when it is detected that the duration period is greater than an exercise determination duration period, controlling the secondary screen to be displayed by lighting up

Fig. 2

INTELLIGENT DISPLAY METHOD AND DEVICE, COMPUTER PROGRAM PRODUCT AND STORAGE MEDIUM

The present disclosure claims the priority to the Chinese Patent Application No. 202110650329.2, entitled "INTELLIGENT DISPLAY METHOD AND DEVICE, COMPUTER PROGRAM PRODUCT AND STORAGE MEDIUM" filed to China Patent Office on Jun. 10, 2021, the entire contents of which are incorporated into the present disclosure by reference.

TECHNICAL FIELD

The present disclosure relates to a technical field of intelligent control, and more particularly, to an intelligent display method and device, a computer program product and a storage medium.

DESCRIPTION OF RELATED ART

At present, people pay more and more attention to physical health, they often exercise in the gym, and there are more and more scenes of using wearable devices to monitor heart rate and blood oxygen.

It should be noted that athletes often keep a constant posture during the actual exercise process; for example, when exercising on an elliptical machine, athletes arms will hold an armrest above the machine, and at this moment, if the user wants to see his heart rate data, the user needs to flip his wrist and wake up the screen, but sometimes a flip angle is not recognized properly and thus the screen cannot be awakened, which is very inconvenient; or, sports enthusiasts set a goal of aerobic fat loss when running, but the heart rate is often too high due to poor control of running speed, and instead anaerobic exercise is performed, as a result, there is no fat loss effect, therefore it is needed to observe information prompts on the wearable product at any time to avoid the above problems. However, it is particularly troublesome to frequently flip the wrist during exercise to observe the information prompts of the wearing product at any time, which affects the rhythm of the exercise.

SUMMARY

A main object of the present disclosure is to provide an intelligent display method and device, a computer program product and a storage medium, aiming to solve technical problems of how to control a secondary screen of a wearable device to display prompt information during a user's exercise, so as to improve the convenience of acquiring information by the user when in the exercising state.

In order to achieve the above object, the present disclosure provides an intelligent display method. The wearable device comprises a main screen, a secondary screen and a watch strap, the watch strap is disposed on both sides of the main screen, and the secondary screen is disposed on the watch strap. The intelligent display method comprises following steps:

when the wearable device is in an operating state, acquiring, at a preset acquisition frequency, swing amplitudes of an arm on which the wearable device is located, and determining, at a preset detection frequency, a maximum value and a minimum value of the swing amplitudes of the arm among the swing amplitudes that are acquired within the latest preset duration period from current moment;

when the minimum value is greater than a first preset threshold value and a difference between the maximum value and the minimum value is less than or equal to a second preset threshold value, starting timing and determining the duration period for which the minimum value is continuously greater than the first preset threshold value and the difference between the maximum value and the minimum value is continuously less than or equal to the second preset threshold value; and when it is detected that the duration period is greater than an exercise determination duration period, controlling the secondary screen to be displayed by lighting up.

Optionally, the step of when the minimum value is greater than a first preset threshold value, and a difference between the maximum value and the minimum value is less than or equal to a second preset threshold value, starting timing and determining the duration period for which the minimum value is continuously greater than the first preset threshold value and the difference between the maximum value and the minimum value is continuously less than or equal to the second preset threshold value, comprises:

when the minimum value is greater than the first preset threshold value and the maximum value is less than a third preset threshold value and the difference between the maximum value and the minimum value is less than or equal to the second preset threshold value, starting timing and determining the duration period for which the minimum value is continuously greater than the first preset threshold value, the maximum value is continuously less than the third preset threshold value, and the difference between the maximum value and the minimum value is continuously less than or equal to the second preset threshold value.

Optionally, the secondary screen includes a preset number of display areas, the wearable device includes a secondary screen display switching button; after a step of controlling the secondary screen to be displayed by lighting up, the intelligent display method further comprises:

when a display switching instruction sent by a user through the secondary screen display switching button is detected, switching the display areas for displaying data information in the secondary screen according to the display switching instruction.

Optionally, after a step of controlling the secondary screen to be displayed by lighting up, the intelligent display method further comprises:

controlling the main screen to extinguish and making the main screen to enter a dormant state.

Optionally, after a step of controlling the secondary screen to be displayed by lighting up, the intelligent display method further comprises:

when it is detected that the duration period is longer than a normal exercise duration period, sending a prompt message to the user to inform the user that exercise time is too long.

Optionally, after a step of controlling the secondary screen to be displayed by lighting up, the intelligent display method further comprises:

acquiring a current swing amplitude of the arm, and when the current swing amplitude is less than or equal to the first preset threshold value or when the current swing amplitude is greater than or equal to the third preset threshold value, controlling the secondary screen to extinguish.

Optionally, before the step that when it is detected that the duration period is greater than an exercise determination duration period, controlling the secondary screen to be displayed by lighting up, the intelligent display method further comprises:

when the minimum value is less than or equal to the first preset threshold value, and/or, a difference between the maximum value and the minimum value is greater than the second preset threshold value, deleting the duration period and performing a step that when the minimum value is greater than the first preset threshold value, and the difference between the maximum value and the minimum value is less than or equal to the second preset threshold value, starting timing and determining the duration period for which the minimum value is continuously greater than the first preset threshold value and the difference between the maximum value and the minimum value is continuously less than or equal to the second preset threshold value.

Further, in order to achieve the above object, the present disclosure also provides an intelligent display device, the intelligent display device includes a memory, a processor, and an intelligent display program stored in the memory and operable on the processor, the intelligent display method as described above is realized when the intelligent display program is executed by the processor.

Further, in order to achieve the above object, the present disclosure also provides a computer program product, the computer program product includes an intelligent display program, and the intelligent display method as described above is realized when the intelligent display program is executed by a processor.

Further, in order to achieve the above object, the present disclosure also provides a computer-readable storage medium, on which an n intelligent display program is stored, and the intelligent display method as described above is realized when the intelligent display program is executed by a processor.

In the present disclosure, when a wearable device is in a operating state, swing amplitudes of an arm on which the wearable device is located are acquired at a preset acquisition frequency, and the maximum value and the minimum value of the swing amplitudes of the arm that are acquired within the latest preset duration period from the current moment are determined at a preset detection frequency, and a duration period for which the minimum value is continuously greater than a first preset threshold value and the difference between the maximum value and the minimum value is continuously less than or equal to a second preset threshold value is determined, and when it is detected that the duration period is greater than exercise determination duration period, the secondary screen of the wearable device is controlled to be displayed by lighting up. According to the present disclosure, a duration period for which the user is possibly in an exercising state is determined by determining the maximum value and the minimum value of swing amplitudes of an arm within the latest preset duration period, and when the duration period is greater than a determined exercise duration period, the user is in the exercising state, and the secondary screen is controlled to be displayed by lighting up, thereby improving the convenience of obtaining information by the user when in an exercising state.

BRIEF DESCRIPTION OF DRAWINGS

In order to more clearly illustrate the embodiments of the present disclosure or the technical solutions in the prior art, the drawings required to be used for the content of the embodiments or the prior art will be briefly introduced in the following. Obviously, the drawings in the following description are merely a part of the drawings of the present disclosure, and for those of ordinary skill in the art, other drawings can also be obtained from the provided drawings without any creative effort.

FIG. 2 is a schematic flow diagram of a first embodiment of an intelligent display method of the present disclosure;

Figure 1:
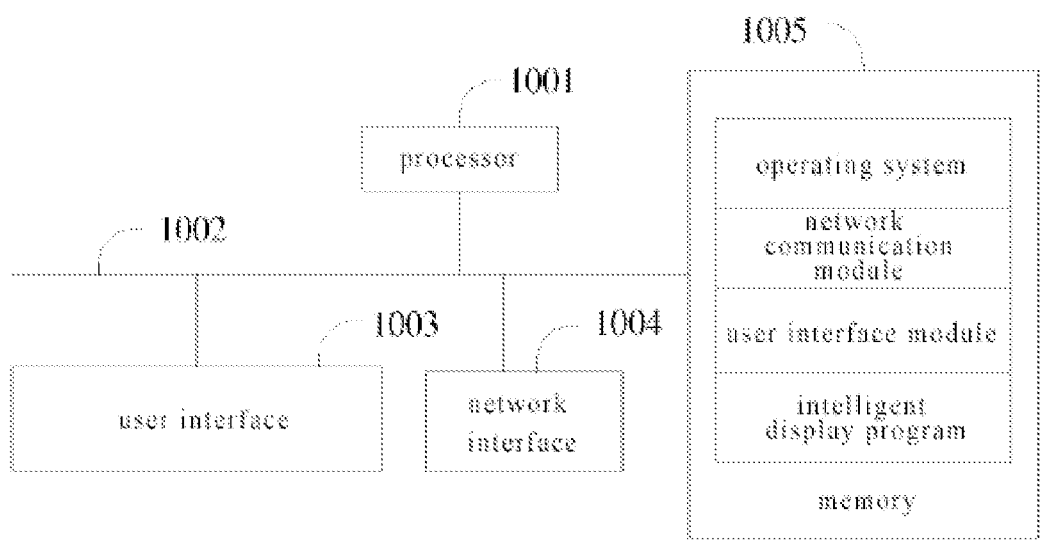
FIG. 1 is schematic structural diagram of a hardware operating environment of an intelligent display device according to an embodiment of the present disclosure.

Explanation of symbols of main components: wearable device 10; main screen 101; secondary screen 102; watch strap 103; secondary screen display switching button 104.

DETAILED DESCRIPTIONS

Technical solutions of embodiments of the present disclosure will be described below with reference to the drawings in the embodiments of the present disclosure. Obviously, the described embodiments are only a part of the embodiments of the present disclosure, rather than all the embodiments. Based on the embodiments in the present disclosure, all other embodiments obtained by those of ordinary skill in the art without creative efforts shall fall within the protection scope of the present disclosure.

It should be noted that athletes often keep a constant posture during the actual exercise process; for example, when exercising on an elliptical machine, athletes arms will hold an armrest above the machine, and at this moment, if the user wants to see his heart rate data, the user needs to flip his wrist and wake up the screen, but sometimes a flip angle is not recognized properly and thus the screen cannot be awakened, which is very inconvenient; or, sports enthusiasts set a goal of aerobic fat loss when running, but the heart rate is often too high due to poor control of running speed, and instead anaerobic exercise is performed, as a result, there is no fat loss effect, therefore it is needed to observe information prompts on the wearable product at any time to avoid the above problems. However, it is particularly troublesome to frequently flip the wrist during exercise to observe the information prompts of the wearing product at any time, which affects the rhythm of the exercise.

Based on the above defects, the present disclosure provides an intelligent display device. Referring to FIG. 1, FIG. 1 is schematic structural diagram of a hardware operating environment of an intelligent display device according to an embodiment of the present disclosure.

As shown in FIG. 1, the intelligent display device may include: a processor 1001 such as a CPU; a communication bus 1002; a user interface 1003; a network interface 1004; and a memory 1005. Here, the communication bus 1002 is used to realize connection and communication between these components. The user interface 1003 may include a display screen (Display), an input unit such as a keyboard (Keyboard), and the optional user interface 1003 may further include a standard wired interface, a wireless interface. Optionally, the network interface 1004 may include a standard wired interface or a wireless interface (such as a WI-FI interface). The memory 1005 may be a high-speed RAM memory, or a stable memory (non-volatile memory) such as a disk memory. Optionally, the memory 1005 may also be a storage device independent of the afore-mentioned processor 1001.

Those skilled in the art may understand that the hardware structure of the intelligent display device shown in FIG. 1 does not constitute a limitation on the intelligent display device, and more or fewer components than shown in the figure may be included, or combinations of certain components or different component arrangements may be included.

As shown in FIG. 1, the memory 1005 as a computer-readable storage medium may include an operating system, a network communication module, a user interface module, and an intelligent display program. Here, the operating system is a program for managing and controlling the intelligent display device and software resources, and supports the operation of network communication module, user interface module, intelligent display program and other program or software. The network communication module is used to manage and control the network interface 1004, and the user interface module is used to manage and control the user interface 1003.

In the hardware structure of the intelligent display device shown in FIG. 1, the network interface 1004 is mainly used to be connected to a background server and perform data communication with the background server, the user interface 1003 is mainly used to be connected to a client terminal and perform data communication with the client terminal, and the processor 1001 may be used to call the intelligent display program stored in the memory 1005 and perform the following operations:

when the wearable device is in an operating state, acquiring, at a preset acquisition frequency, swing amplitudes of an arm on which the wearable device is located, and determining, at a preset detection frequency, a maximum value and a minimum value of the swing amplitudes of the arm among the swing amplitude that are acquired within a latest preset duration period from current moment;

when the minimum value is greater than a first preset threshold value, and a difference between the maximum value and the minimum value is less than or equal to a second preset threshold value, starting timing and determining the duration period for which the minimum value is continuously greater than the first preset threshold value and the difference between the maximum value and the minimum value is continuously less than or equal to the second preset threshold value; and when it is detected that the duration period is greater than a determined exercise duration period, controlling the secondary screen to be displayed by lighting up.

Further, the step that when the minimum value is greater than a first preset threshold value, and a difference between the maximum value and the minimum value is less than or equal to a second preset threshold value, starting timing and determining the duration period for which the minimum value is continuously greater than the first preset threshold value and the difference between the maximum value and the minimum value is continuously less than or equal to the second preset threshold value, includes:

when the minimum value is greater than the first preset threshold value, the maximum value is less than a third preset threshold value, and the difference between the maximum value and the minimum value is less than or equal to the second preset threshold value, starting timing and determining the duration period for which the minimum value is continuously greater than the first preset threshold value, the maximum value is continuously less than the third preset threshold value, and the difference between the maximum value and the minimum value is continuously less than or equal to the second preset threshold value.

Further, the secondary screen includes a preset number of display areas, the wearable device includes a secondary screen display switching button. After a step of controlling the secondary screen to be displayed by lighting up, the intelligent display method further includes:

when a display switching instruction sent by a user through the secondary screen display switching button is detected, switching the display areas for displaying data information in the secondary screen according to the display switching instruction.

Further, after a step of controlling the secondary screen to be displayed by lighting up, the intelligent display method further includes:

controlling the main screen to extinguish and making the main screen to enter a dormant state.

Further, after controlling the secondary screen to be displayed by lighting up, the intelligent display method further includes:

when it is detected that the duration period is longer than a normal exercise duration period, sending a prompt message to the user to inform the user that exercise time is too long.

Further, after a step of controlling the secondary screen to be displayed by lighting up, the intelligent display method further includes:

acquiring a current swing amplitude of the arm, and when the current swing amplitude is less than or equal to the first preset threshold value or when the current swing amplitude is greater than or equal to the third preset threshold value, controlling the secondary screen to extinguish.

Further, before the step that when it is detected that the duration period is greater than an exercise determination duration period, controlling the secondary screen to be displayed by lighting up, the intelligent display method further includes:

when the minimum value is less than or equal to the first preset threshold value, and/or, a difference between the maximum value and the minimum value is greater than the second preset threshold value, deleting the duration period, performing the step that when the minimum value is greater than the first preset threshold value, and the difference between the maximum value and the minimum value is less than or equal to the second preset threshold value, starting timing and determining the duration period for which the minimum value is continuously greater than the first preset threshold value and the difference between the maximum value and the minimum value is continuously less than or equal to the second preset threshold value.

The embodiments of the intelligent display device of the present disclosure are substantially the same as the embodiments of the intelligent display method described below, which will not be repeated here.

The present disclosure also provides an intelligent display method based on the above-mentioned intelligent display device.

Referring to FIG. 2, FIG. 2 is a schematic flow diagram of a first embodiment of an intelligent display method of the present disclosure.

Embodiments of the present disclosure provide an embodiment of the intelligent display method. It should be noted that although the logic sequence is shown in the flow diagram, in some cases, the sequence shown or described can be executed in a different order.

In each embodiment of the intelligent display method, the execution is performed by the intelligent display device.

The intelligent display method is applied to a wearable device, and the wearable device includes a main screen, a secondary screen and a watch strap, the watch strap is disposed on both sides of the main screen, and the secondary screen is disposed on the watch strap. The intelligent display method includes:

S10, when the wearable device is in an operating state, acquiring, at a preset acquisition frequency, the swing amplitudes of the arm on which the wearable device is located, and determining, at a preset detection frequency, the maximum value and the minimum value of the swing amplitudes of the arm among the swing amplitudes that are acquired within a latest preset duration period from current moment.

Athletes often keep a constant posture during the actual exercise process; for example, when exercising on an elliptical machine, athletes arm will hold an armrest above the machine, and at this moment, if the user wants to see his heart rate data, the user needs to flip his wrist and wake up the screen, but sometimes a flip angle is not recognized properly and thus the screen cannot be awakened, which is very inconvenient; or, sports enthusiasts set a goal of aerobic fat loss when running, but the heart rate is often too high due to poor control of running speed, and instead anaerobic exercise is performed, as a result, there is no fat loss effect, therefore, it is needed to observe information prompts on the wearable product at any time to avoid the above problems. However, it is particularly troublesome to frequently flip the wrist during exercise to observe the information prompts of the wearing product at any time, which affects the rhythm of the exercise.

In order to solve the technical problem of how to control the secondary screen of the wearable device to display prompt information during the user's exercise to improve the convenience of obtaining information by the user during exercise, the embodiment of the present disclosure provides an intelligent display method, which is configured such that, when the wearable device is in an operating state, acquiring, at a preset acquisition frequency, swing amplitudes of an arm on which the wearable device is located, and determining, at a preset detection frequency, a maximum value and a minimum value of the swing amplitudes of the arm among the swing amplitudes acquired within a latest preset duration period from current moment, and determining a duration period for which the minimum value is continuously greater than the first preset threshold value and the difference between the maximum value and the minimum value is continuously less than or equal to the second preset threshold value, and when it is detected that the duration period is greater than an exercise determination duration period, controlling the secondary screen to be displayed by lighting up. According to the present disclosure, a duration period for which the user is possibly in an exercising state is determined by determining the maximum value and the minimum value of swing amplitudes of an arm within the latest preset duration period, and when the duration period is greater than and exercise determination duration period, the user is in the exercising state, and the secondary screen is controlled to be displayed by lighting up, thereby improving the convenience of obtaining information by the user when in an exercising state.

The intelligent display method in the present embodiment is applicable to a device with an intelligent display function.

Figure 3:
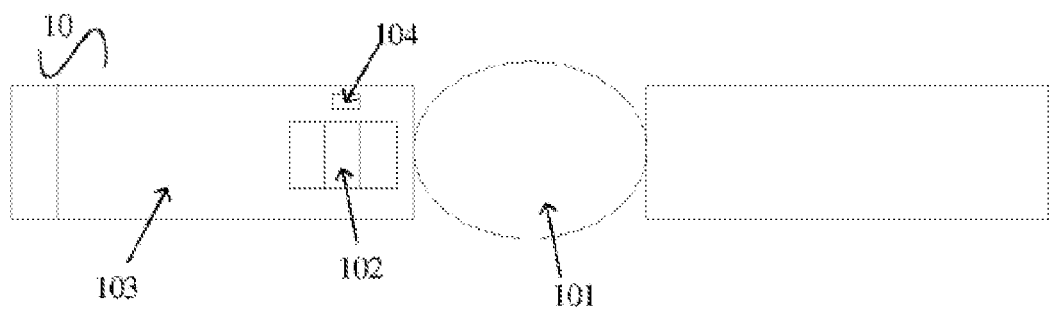
FIG. 3 is schematic structural diagram of a wearable device in an embodiment of the present disclosure.

In the present embodiment, the wearable device includes, but is not limited to, a smart watch, or the like. As shown in FIG. 3, the wearable device includes a main screen 101, a secondary screen 102 and a watch strap 103, the watch strap is disposed on both sides of the main screen, and the secondary screen is provided on the watch strap. Here, watch straps on both sides of the main screen may be equipped with secondary screens, or the watch strap on only one side of the main screen is equipped with a secondary screen, and in the case where the watch straps on both sides are equipped with secondary screens, the user can observe the information displayed on the secondary screen during exercising regardless of which arm wears the wearable device by the user.

The main screen is generally used to display data information in normal mode, and the secondary screen is generally used to display data information in sports mode. The data information displayed on the main screen and secondary screen may include but not limited to one or more of time, temperature or exercise data, etc. The exercise data may include but not limited to one or more of heart rate, steps, blood oxygen, or calorie consumption, etc.

The wearable device includes but is not limited to a microprocessor, a graphics processor, a vibration module, a display module 1, a display module 2, a mobile communication module, a heart rate detection module, a motion recognition module, a secondary screen display switching button, a battery and a power management module.

The motion recognition module includes but is not limited to an acceleration sensor unit, a gyroscope sensor unit, etc., which can detect the user's wrist action and notify the microprocessor.

The heart rate detection module is used to detect the user's heart rate data and notify the microprocessor.

The display module 1 is a main screen, which functions to display in normal mode.

The display module 2 is a secondary screen, wherein the secondary screen is divided into three display areas, functioning to display in sports mode.

The microprocessor module is used to control the operation of the entire system and process the received data, for example, functions to switch the display screens, display heart rate, etc.

The vibration module performs vibration response to various operations of the user.

The heart rate detection module is used to detect the user's heart rate data and notify the microprocessor.

Taking a smart watch as an example, a flexible screen which is a low-power ink screen may be equipped on the watch strap, and the displaying content thereof may be simple data such as time or heart rate, such a screen displays according to the actual state of the user. When the user is in a normal state, the device displays the content of the main screen, and when the user is in a specific exercising state, the device displays the content of the secondary screen. For example, when the user is exercising on the elliptical machine, in the case where the user's hands are put on the armrest of the machine, at this time, the direction of the main screen is inconsistent with that of the eyes, and the secondary screen lights up to allow the user to see the information on the secondary screen and detect own motion data in real time. For another example, when the user is running, the wearable device determines that the user is in an exercising state, at this time, the secondary screen lights up to display exercise information, and the user determines own current state information according to the content displayed on the screen. When the user wears the wearable device, a display interface of the main screen and a display interface of the secondary screen are not positioned on the same plane, and their display interfaces are not parallel to each other, and their display interfaces are generally perpendicular to each other.

The wearable device includes an action recognition module. The action recognition module includes but is not limited to an acceleration sensor unit and a gyroscope sensor unit and the like. The acceleration sensor may be used to measure the motion posture of the object, and the gyroscope sensor unit may also be used to measure the motion direction of the object, so that swing amplitude of the arm on which the wearable device is located can be measured. The swing amplitude of the arm refers to an angle at which the arm swings upward from a position parallel to the body. For example, when the arm is parallel to the body, that is, when the human body is standing and the arm is vertically downward, the swing amplitude of the arm is 0, if the arm swings upward by 30° at this time, the swing amplitude of the arm is 30°, and if the arm swings upward by 10° on the basis of 30°, the swing amplitude of the arm is 40° at this time.

When the wearable device is in an operating state, the swing amplitude of the arm where the wearable device is located is monitored in real time. The wearable device being in the operating state may mean that the wearable device has been turned on or the wearable device has switched on the motion display function. The arm may refer to an upper arm and/or forearm, the upper arm refers to a part between the shoulder and the elbow, and the forearm refers to a part between the elbow and the wrist. Since the wearable device is generally located at the wrist, the arm is generally the forearm, that is, the swing amplitude of the forearm where the wearable device is located is monitored.

Swing amplitudes of the arm is acquired in real time, or swing amplitudes of the arm is acquired at a preset acquisition frequency, and the maximum value and the minimum value of the swing amplitudes of the arm that are acquired within the latest preset duration period from the current moment before the current moment are determined at a preset detection frequency, that is, the maximum value and the minimum value may vary over time. For example, the preset detection frequency may be 10 Hz, and the maximum value and the minimum value of the swing amplitudes of the arm that are acquired within the latest 3 s before the current moment are determined every 0.1 s. Or, the preset detection frequency may be 20 Hz, and the maximum value and the minimum value of the swing amplitudes of the arm that are acquired within the latest preset duration period from the current moment are determined every 0.05 s.

It should be noted that if swing amplitudes of the arm are acquired at the preset acquisition frequency, since the detection frequency is generally lower than the acquisition frequency, the preset detection frequency may be less than or equal to the preset acquisition frequency. In this case, the intelligent display device may not perform useless detection steps until new data is obtained. Here, the greater the preset acquisition frequency and the preset detection frequency are, the accuracy of determining whether the user is in an exercising state is higher.

Since the swing amplitudes of the arm of the user are different before and after exercising, it is possible to remove previous useless data by determining whether the user is in an exercising state according to the data acquired within the latest preset duration period. For example, the user is in a walking state at the 1st second, and starts exercising at the 10th second, and if the current moment is the 17th second and the user is in the exercising state, at this time, it is possible to remove the previous useless data by determining whether the user is in an exercising state through determining the maximum value and the minimum value of the swing amplitudes among the swing amplitudes of the arm that are acquired within the latest 5 s. In the embodiment, the exercise determination duration period is not limited, the exercise determination duration period may be 20 s, 15 s, or 10 s and the like. Here, the user being in an exercising state does not include the user's walking state.

S20, when the minimum value is greater than a first preset threshold value, and a difference between the maximum value and the minimum value is less than or equal to a second preset threshold value, starting timing and determining the duration period for which the minimum value is continuously greater than the first preset threshold value and the difference between the maximum value and the minimum value is continuously less than or equal to the second preset threshold value.

In the embodiment, since the swinging amplitudes of the arm are generally greater than 0 during exercise, that is, the arm is generally not in a state parallel to the body, therefore when the minimum value of the swinging amplitudes of the arm is greater than the first preset threshold value, the user may be in an exercising state, and at this time, the use's walking process and static state can be excluded. For example, the first preset threshold value may be 10°, 15°, 20°, and the like.

Meanwhile, if the user is in an exercising state, a change in the swing amplitudes of the arm is small, and the arm generally maintains a constant posture, therefore the difference between the maximum value and the minimum value of the swing amplitudes should be within a certain range, and the difference between the maximum value and the minimum value is less than or equal to the second preset threshold value. For example, the second preset threshold value may be 15°, 200, 400, and so on. Here, there is no relationship between the first preset threshold value and the second preset threshold value.

Accordingly, the present embodiment continuously determine the maximum value and the minimum value of swing amplitudes within the latest exercise determination duration period. When the minimum value is greater than the first preset threshold value, and the difference between the maximum value and the minimum value is less than or equal to the second preset threshold value, it indicates that the user is in a suspected exercising state, that is, the user may or may not be in an exercising state, then at this time, starting timing; if a duration period for which the user is continuously in a suspected exercising state reaches a certain duration period, it is determined that the user is in an exercising state.

Then, the present embodiment further determines a duration period for which the minimum value is continuously greater than the first preset threshold value and the difference between the maximum value and the minimum value is continuously less than or equal to the second preset threshold value. That is, determining a duration period for which the minimum value is constantly greater than the first preset threshold value while the difference between the maximum value and the minimum value is constantly less than or equal to the second preset threshold value.

S30, when it is detected that the duration period is greater than an exercise determination duration period, controlling the secondary screen to be displayed by lighting up.

In the present embodiment, when it is detected that the duration period for which the minimum value is continuously greater than the first preset threshold value and the difference between the maximum value and the minimum value is continuously less than or equal to the second preset threshold value is greater than the exercise determination duration period, it indicates that the duration period for which the user is continuously in a suspected exercising state reaches a duration period sufficient to determine that the user is in an exercising state, it is determined that the user is in an exercising state, and at this time, the secondary screen of the wearable device is controlled to be displayed by lighting up.

It should be noted that when the wearable device is operating, data information is generally displayed on the main screen, but since the user's arm generally maintains one posture when exercising, the user cannot directly view the information displayed on the main screen, accordingly, the secondary screen not positioned on the same plane as the main screen may be controlled to be displayed by lighting up.

It should be noted that, in one embodiment, when the microprocessor of the wearable device detects that the minimum value is greater than the first preset threshold value, and the difference between the maximum value and the minimum value is less than or equal to the second preset threshold value, it is determined that the user's arm is in a suspected exercising state. At this time, the timing module of the wearable device continuously records a time T1 during which the arm is in a suspected exercising state, and feeds this kind of data back to the microprocessor. When T1 is less than or equal to the exercise determination duration period, the microprocessor determines that the user is in a normal state, the user is not exercising and the arm is swinging normally. At this time, the secondary screen does not operate, the main screen operates normally, and operations such as lifting the wrist for lighting up screen are not affected, thus there is no difference from ordinary intelligent device. If the arm continuously maintains the suspected exercising state, the recorded time T1 continuously increases. When T1 is greater than the exercise determination duration period, the microprocessor determines that the user is in an exercising state, and at this time, the secondary screen starts to operate, the main screen does not operate, so as to reduce power consumption. Also, the secondary screen mainly displays simple data such as heart rate, time, etc. Once the user puts down the arm or lifts the wrist, etc., the counting of time T1 has been completed. At this time, the microprocessor exits the current exercise mode, controls the main screen to operate normally, and the secondary screen does not operate, and starts to record time T2, then repeats the previous determination logic.

The present disclosure is configured such that, when the wearable device is in an operating state, acquiring, at a preset acquisition frequency, swing amplitudes of an arm on which the wearable device is located; determining, at a preset detection frequency, a maximum value and a minimum value of the swing amplitudes of the arm among the swing amplitudes acquired within a latest preset duration period from current moment; and determining a duration period for which the minimum value is continuously greater than a first preset threshold value and the difference between the maximum value and the minimum value is continuously less than or equal to a second preset threshold value, and when it is detected that the duration period is greater than an exercise determination duration period, controlling the secondary screen of the wearable device to be displayed by lighting up. The present disclosure is configured such that, determining a duration period for which the user is in a suspected exercising state by determining the maximum value and the minimum value of swing amplitudes of an arm within the latest preset duration period, and when the duration period is greater than an exercise determination duration period, the user is in an exercising state, then controlling the secondary screen to be displayed by lighting up, thereby improving the convenience of obtaining information by the user when in an exercising state.

Furthermore, the present disclosure proposes a second embodiment of the intelligent display method, wherein the above step S20 includes:

S201, when the minimum value is greater than the first preset threshold value, the maximum value is less than a third preset threshold value, and the difference between the maximum value and the minimum value is less than or equal to the second preset threshold value, starting timing and determining the duration period for which the minimum value is continuously greater than the first preset threshold value, the maximum value is continuously less than the third preset threshold value, and the difference between the maximum value and the minimum value is continuously less than or equal to the second preset threshold value.

In the present embodiment, since the maximum swing amplitude of the arm may not be too large during a normal exercise, a third preset threshold value is set for the maximum value of swing amplitudes of the arm. When the minimum value of swing amplitudes of the arm within the latest exercise determination duration period is greater than the first preset threshold value, the maximum value of swing amplitudes of the arm is less than the third preset threshold value, and the difference between the maximum value and the minimum value is less than or equal to the second preset threshold value, at this time, the user is in a suspected exercising state, it is determined a duration period for which the minimum value is continuously greater than the first preset threshold value, the maximum value is continuously smaller than the third preset threshold value, and the difference between the maximum value and the minimum value is continuously less than or equal to the second preset threshold value. For example, the third preset threshold value may be 130°, 120° or 110°, and the like. Here, the third preset threshold value is greater than the first preset threshold value.

If the duration period is longer than the exercise determination duration period, the secondary screen is controlled to be displayed by lighting up.

In the present embodiment, the maximum value of swing amplitudes of the arm is defined to be less than the third preset threshold value, and since the swing amplitude of the arm may not be too large during exercise, it can be more accurately determined whether the user is in an exercising state, and thus it can be more accurately determined whether to control the secondary screen to be displayed by lighting up.

Furthermore, the present disclosure proposes a third embodiment of the intelligent display method, wherein the secondary screen includes a preset number of display areas, the wearable device includes a secondary screen display switching button, and in the above step S30 or S201, after a step of controlling the secondary screen to be displayed by lighting up, the intelligent display method further includes:

S401, when a display switching instruction sent by a user through the secondary screen display switching button is detected, switching the display areas for displaying data information in the secondary screen according to the display switching instruction.

In the present embodiment, the secondary screen of the wearable device includes a preset number of display areas, wherein the preset number is greater than or equal to two. the secondary screen may use one or more of the preset display areas to display the data information when displaying data information. After controlling the secondary screen to be displayed by lighting up, the user can switch the display area of the secondary screen for displaying data information by the display switching instruction.

As shown in FIG. 3, the secondary screen of the wearable device may include three display areas, and a secondary screen display switching button 104 may be provided on the wearable device. The user may send a display switching instruction to the wearable device by a method that a secondary screen display switching button is provided on the wearable device and the user can switch the display area of the secondary screen for displaying data information by pressing the display switching button. For example, there are a display area 1, a display area 2 and a display area 3 in the secondary screen, and the user can switch the display area of the secondary screen by the secondary screen display switching button; here, each time the switching button is pressed for a short time, the display area of the secondary screen is switched from the display area 1 to the display area 2, or switched from the display area 2 to the display area 3, or switched from the display area 3 to the display area 1. The display area may be set according to user's own observation needs.

Here, the user may also control a plurality of display areas of the secondary screen to display data information by pressing the switching button for a long time. For example, the display area currently displaying data information is the display area 1, and if the user presses the switching button for a long time of 3 s, then the display area 1 and display area 2 display data at the same time.

The user may also send a display switching instruction to the wearable device by a method that the user sends the display switching instruction to the wearable device through voice and the wearable device switches the display areas by recognizing the user's voice. For example, the user sends a voice of "displaying area 2" or "switching display area 1 to display area 2" to the wearable device to control the secondary screen to switch display areas, and display data information through the display area 2.

In the present embodiment, by setting a plurality of display areas on the secondary screen, the user can actively set the display areas according to the observation needs of the user during exercise, which improves the convenience of observing own exercise data by the user during exercise.

Furthermore, the present disclosure proposes a fourth embodiment of the intelligent display method, wherein in the above steps S30 or S201, after a step of controlling the secondary screen to be displayed by lighting up, the intelligent display method further includes:

S402, controlling the main screen to extinguish and making the main screen to enter a dormant state.

In the present embodiment, the wearable device includes a main screen. In normal mode, the main screen of the wearable device operates and displays data information, and the secondary screen extinguishes and does not operate. When it is detected that the user is in an exercising state, the secondary screen is controlled to be displayed by lighting up, and at this time, the main screen can be simultaneously controlled to extinguish and enter a dormant state, and functions of the main screen such as lifting the wrist for lighting up screen are turned off, such that the secondary screen of the wearable device operates and the main screen does not operate, so as to reduce the power consumption of the wearable device.

In the present embodiment, when it is detected that the user is in an exercising state, the secondary screen is controlled to be displayed by lighting up, then the main screen is controlled to extinguish and enter a dormant state, thereby reducing the power consumption of the wearable device.

Furthermore, the present disclosure proposes a fifth embodiment of the intelligent display method, wherein in the above step S30 or S201, after a step of controlling the secondary screen to be displayed by lighting up, the intelligent display method further includes:

S403, when it is detected that the duration period is longer than a normal exercise duration period, sending a prompt message to the user to inform the user that exercise time is too long.

In the present embodiment, the normal exercise duration period refers to the maximum continuous exercise duration period that the human body can generally withstand without being injured under normal circumstances. As for the normal exercise duration period, it can be analyzed by obtaining motion data from a large number of samples of people to obtain a corresponding relationship between normal exercise duration period and age, gender, in this way, the normal exercise duration period of the user can be determined based on the corresponding relationship by obtaining the age and gender of the user wearing the wearable device.

The normal exercise duration period may also be set by the user, the user may set a normal exercise duration period before exercising, the normal exercise duration period may be kept for the user's future exercise. The user may also set the normal exercise duration period before each exercise, and delete the currently set normal exercise duration period when the exercise ends.

When it is detected that the duration period is longer than a normal exercise duration period, it means that the user has been exercised for too long time and the body may be damaged. At this time, a prompt message may be sent to the user to inform the user that exercise time is too long and injury may occur. The prompt message may be sent to the user by a method of controlling a vibration module of the wearable device to vibrate to inform the user, and the wearable device may be controlled to stop vibration after a preset prompt duration period of the vibration of the wearable device, and the user may also stop the vibration of the wearable device through a button on the wearable device.

Meanwhile, if the duration period is too long, it may be mistakenly determined that the user is in an exercising state. At this time, a fault determination duration period may be set, the fault determination duration period is longer than the normal exercise duration period. If the duration period is longer than the fault determination duration period, it may be mistakenly determined that the user is in an exercising state. At this time, the secondary screen can be controlled to extinguish to make the secondary screen to stop operating.

In the embodiment, if the duration period is longer than a normal exercise duration period, a prompt message is sent to the user to inform the user that exercise time is too long, so as to avoid injury to the user.

Furthermore, the present disclosure proposes a sixth embodiment of the intelligent display method, wherein in the above step S201, after a step of controlling the secondary screen to be displayed by lighting up, the intelligent display method further includes:

S404, acquiring a current swing amplitude of the arm, and when the current swing amplitude is less than or equal to the first preset threshold value or when the current swing amplitude is greater than or equal to the third preset threshold value, controlling the secondary screen to extinguish.

In the present embodiment, after a step of controlling the secondary screen to be displayed by lighting up, acquiring a current swing amplitude of the arm, if the current swing amplitude is less than or equal to the first preset threshold value or the current swing amplitude is greater than or equal to the third preset threshold value, it is determined that the user has exited the exercising state, and at this time, controlling the secondary screen to extinguish to reduce the power consumption.

It should be noted that, if the main screen is in an extinguishing and not operating state at this time, the main screen is controlled to be displayed by lighting up to operate normally.

The embodiment is configured to determine whether the user has exited the exercising state according to the current swing amplitude of the arm, and if the user has exited the exercising state, the secondary screen is controlled to extinguish to reduce the power consumption.

Furthermore, the present disclosure proposes a seventh embodiment of the intelligent display method, wherein in the above step S20, before the step that when it is detected that the duration period is greater than an exercise determination duration period, controlling the secondary screen to be displayed by lighting up, the intelligent display method further includes:

S202, when the minimum value is less than or equal to the first preset threshold value, and/or, a difference between the maximum value and the minimum value is greater than the second preset threshold value, deleting the duration period and performing a step that when the minimum value is greater than the first preset threshold value and the difference between the maximum value and the minimum value is less than or equal to the second preset threshold value, starting timing and determining the duration period for which the minimum value is continuously greater than the first preset threshold value and the difference between the maximum value and the minimum value is continuously less than or equal to the second preset threshold value.

In the present embodiment, before it is detected that the duration period is greater than the exercise determination duration period, if it is detected that the minimum value is less than or equal to the first preset threshold value, and/or, a difference between the maximum value and the minimum value is greater than the second preset threshold value, it indicates that the user is currently not in a suspected exercising state, at this time, the duration period for which the user is continuously in a suspected exercising state is deleted. When the minimum value of swing amplitudes within the latest preset duration period from the current moment is greater than the first preset threshold value and the difference between the maximum value and the minimum value is less than or equal to the second preset threshold value, restarting timing and re-determining the duration period. At this time, the main screen operates normally, and the secondary screen does not operate.

The present embodiment is configured such that, before it is detected that the duration period is greater than an exercise determination duration period, if the user is currently not in a suspected exercising state, then deleting the duration period for which the user is continuously in a suspected exercising state. When the swing amplitude of the arm satisfies the timing condition again, restarting timing and re-determining the duration period, which improves the accuracy of controlling the secondary screen to be displayed by lighting up.

In addition, the present disclosure also provides a computer program product, the computer program product includes an intelligent display program, and the above-mentioned intelligent display method is realized when the intelligent display program is executed by a processor.

The specific implementations of the computer program product of the present disclosure are substantially the same as the embodiments of the intelligent display method described above, which will not be repeated herein.

In addition, the present disclosure also provides a computer-readable storage medium.

An intelligent display program is stored on the computer-readable storage medium, and steps of the above-mentioned intelligent display method are realized when the intelligent display program is executed by a processor.

The specific implementations of the computer-readable storage medium of the present disclosure are substantially the same as the embodiments of the intelligent display method described above, which will not be repeated herein.

The various embodiments in the present disclosure are described in a parallel manner or progressive manner, and each embodiment focuses on the differences from other embodiments. The same or similar parts between each embodiment may be referred to each other. As for the device disclosed in the embodiment, the description is relatively simple since it corresponds to the intelligent display method disclosed in the embodiments. The relevant information may refer to the description for method.

Those skilled in the art may also understand that the units and algorithm steps of each example described in combination with the embodiments disclosed herein may be implemented in electronic hardware, computer software or a combination of the both. In order to clearly illustrate the interchangeability of hardware and software, the composition and the steps of each example have been described generally in terms of function in the above descriptions. Whether these functions are executed in hardware or software depends on the specific application and design constraints of the technical solution. Those skilled in the art may use different methods to implement the described functions for each specific application, but such implementation should not be considered beyond the scope of the present disclosure.

The steps of the method or algorithm described in combination with the embodiments disclosed by the present disclosure may be directly implemented using hardware, software modules executed by processors or a combination of the both. The software modules may be embedded in random access memory (RAM), memory, read-only memory (ROM), electrically programmable ROM, electrically erasable programmable ROM, register, hard disk, removable disk, CD-ROM, or any other form of storage medium known in the technical field.

It should also be noted that, relational terms such as first and second herein are only used to distinguish one entity or operation from another entity or operation, and do not necessarily require or imply any actual relationship or order between these entities or operations. Moreover, the terms "comprise", "include" or any other variation thereof are intended to encompass non-exclusive inclusion, such that a process, method, object or device that comprises a series of elements not only includes those elements, but also includes other elements that are not explicitly listed, or also includes elements inherent in such process, method, object or device. Without further limitations, elements limited by the statement "comprising one . . . " do not exclude the existence of other identical elements in the process, method, object or device that includes the elements.

What is claimed is:

1. An intelligent display method, wherein the intelligent display method is applied to a wearable device, the wearable device comprises a main screen, a secondary screen and a watch strap, the watch strap is disposed on both sides of the main screen, and the secondary screen is disposed on the watch strap, the intelligent display method comprises following steps:

when the wearable device is in an operating state, acquiring, at a preset acquisition frequency, swing amplitudes of an arm on which the wearable device is located, and determining, at a preset detection frequency, a maximum value and a minimum value of the swing amplitudes of the arm among the swing amplitudes acquired within a latest preset duration period from current moment;

when the minimum value is greater than a first preset threshold value and a difference between the maximum value and the minimum value is less than or equal to a second preset threshold value, starting timing and determining the duration period for which the minimum value is continuously greater than the first preset threshold value and the difference between the maximum value and the minimum value is continuously less than or equal to the second preset threshold value; and when it is detected that the duration period is greater than an exercise determination duration period, controlling the secondary screen to be displayed by lighting up.

2. The intelligent display method of claim 1, wherein the step that when the minimum value is greater than a first preset threshold value and a difference between the maximum value and the minimum value is less than or equal to a second preset threshold value, starting timing and determining the duration period for which the minimum value is continuously greater than the first preset threshold value and the difference between the maximum value and the minimum value is continuously less than or equal to the second preset threshold value, comprises:

when the minimum value is greater than the first preset threshold value, the maximum value is less than a third preset threshold value and the difference between the maximum value and the minimum value is less than or equal to the second preset threshold value, starting timing and determining the duration period for which the minimum value is continuously greater than the first preset threshold value, the maximum value is continuously less than the third preset threshold value, and the difference between the maximum value and the minimum value is continuously less than or equal to the second preset threshold value.

3. The intelligent display method of claim 1, wherein the secondary screen comprises a preset number of display areas, the wearable device comprises a secondary screen display switching button, and after the step of controlling the secondary screen to be displayed by lighting up, the intelligent display method further comprises:

when a display switching instruction sent by a user through the secondary screen display switching button is detected, switching the display areas for displaying data information in the secondary screen according to the display switching instruction.

4. The intelligent display method of claim 1, wherein after the step of controlling the secondary screen to be displayed by lighting up, the intelligent display method further comprises:

controlling the main screen to extinguish and making the main screen to enter a dormant state.

5. The intelligent display method of claim 1, wherein after the step of controlling the secondary screen to be displayed by lighting up, the intelligent display method further comprises:

when it is detected that the duration period is longer than a normal exercise duration period, sending a prompt message to a user to inform the user that exercise time is too long.

6. The intelligent display method of claim 2, wherein after controlling the secondary screen to be displayed by lighting up, the intelligent display method further comprises:

acquiring a current swing amplitude of the arm, and when the current swing amplitude is less than or equal to the first preset threshold value or when the current swing amplitude is greater than or equal to the third preset threshold value, controlling the secondary screen to extinguish.

7. The intelligent display method of claim 1, wherein before the step that when it is detected that the duration period is greater than an exercise determination duration period, controlling the secondary screen to be displayed by lighting up, the intelligent display method further comprises:

when the minimum value is less than or equal to the first preset threshold value, and/or the difference between the maximum value and the minimum value is greater than the second preset threshold value, deleting the duration period and performing a step that when the minimum value is greater than the first preset threshold value and the difference between the maximum value and the minimum value is less than or equal to the second preset threshold value, starting timing and determining the duration period for which the minimum value is continuously greater than the first preset threshold value and the difference between the maximum value and the minimum value is continuously less than or equal to the second preset threshold value.

8. An intelligent display device, wherein the intelligent display device comprises a memory, a processor, and an intelligent display program stored in the memory and operable on the processor, wherein the intelligent display method of claim 1 is realized when the intelligent display program is executed by the processor.

9. A non-transitory computer-readable storage medium, wherein an intelligent display program is stored on the non-transitory computer-readable storage medium, wherein the intelligent display method of claim 1 is realized when the intelligent display program is executed by a processor.

* * * * *